United States Patent

Henry

[15] 3,685,840
[45] Aug. 22, 1972

[54] PACKING FOR COMPRESSORS, PUMPS OR THE LIKE

[72] Inventor: Ralph E. Henry, Rixford, Pa.
[73] Assignee: Dresser Industries, Inc., Dallas, Tex.
[22] Filed: March 29, 1971
[21] Appl. No.: 129,066

[52] U.S. Cl. ..................277/28, 277/75, 277/79, 92/156
[51] Int. Cl. ........................F16j 15/16, F16j 15/40
[58] Field of Search..........277/79, 70, 71, 72, 75, 28; 92/156, 153; 417/228, 366

[56] References Cited

UNITED STATES PATENTS

| | | | |
|---|---|---|---|
| 2,856,209 | 10/1958 | Watson | 277/28 |
| 3,194,568 | 7/1965 | Payne | 277/75 X |
| 3,334,906 | 8/1967 | Arnold | 277/29 X |
| 3,542,374 | 11/1970 | Neilson | 227/3 X |

*Primary Examiner*—Samuel B. Rothberg
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

The improved packing rings described in detail hereinafter provide an integrally formed, internally located check valve for use in the lubrication systems compressors, pumps or the like. Specifically, and in the preferred form, two adjacent packing rings include face portions arranged in sealing engagement with at least one of the packing rings a lubricant passageway therein. An arcuate groove is formed in the face of one of the packing rings in communication with the lubricant passageway. One of the packing rings includes a pressure-responsive, integrally formed annular lip that encompasses the arcuate groove. The arrangement is such that a predetermined pressure in the lubricant groove moves the lip away from the adjacent packing ring permitting lubricant to pass out of the arcuate groove into the interior of the compressor. During the compression stroke of the compressor, the high pressure existing inside the compressor acts on the pressure responsive lip forcing it into tighter sealing engagement with the adjacent packing ring preventing the compressor pressure from entering the lubrication system.

9 Claims, 2 Drawing Figures

PATENTED AUG 22 1972  3,685,840

INVENTOR:
RALPH E. HENRY

Roy L. Van Winkle
ATTORNEY

PACKING FOR COMPRESSORS, PUMPS OR THE LIKE

BACKGROUND OF THE INVENTION

This invention relates generally to improved packing useful in pumps, compressors or the like. More specifically, but not by way of limitation, this invention relates to improved packing rings providing an integral check valve for the lubrication system of high pressure pumps, compressors or the like.

In the past, pumps, compressors or the like for use in systems wherein the pressures may be in the range of 25,000 p.s.i., and wherein it is necessary to incorporate lubrication in such apparatus to reduce wear on the plunger, seals or the like, it has been the practice to form small lubricant holes that extend through the packing into the high pressure area of the compressors. The lubricant holes are usually arranged so that lubricant passing therethrough will drip or otherwise be deposited on the parts, such as the plunger, that is to be lubricated. Most often, the lubricant holes and passageways are connected by means of an external line or quill with an externally located check valve that functions to prevent the compressor pressure from being applied to the lubricant pump during the compression stroke. By the use of special high pressure fittings, valves, etc., such arrangements were made to function generally satisfactorily. However, the material surrounding the lubricant hole in the packing is subjected to cyclic pressures that vary greatly in magnitude during the compression and intake strokes of the apparatus. The lubricant holes create stress risers and the cyclic pressure applied thereto frequently results in failure of the packing. Difficulty has also been encountered with the external high pressure components previously mentioned due to the cyclic pressures and high pressure differentials applied thereto.

To solve the problems encountered with the external components, spring loaded check valves have been mounted internally of the compressor. While this arrangement has resulted in the elimination of some of the external problems, lubricant holes still introduce stress risers within the compressor. Also, the check valve with its moving parts, is subjected to the deleterious effects of the materials being passed through the compressor or the pump. While this arrangement has solved some of the problems and has worked with some degree of success, it is more difficult to manufacture and it has also met with relatively frequent malfunctions.

An object of this invention is to provide an improved packing ring for high pressure compressors, pumps or the like that eliminate the presence of the stress riser associated with lubricant systems of previously known compressors.

Another object of the invention is to provide an improved packing ring including an integral check valve having no moving parts and requiring little or no maintenance during its service life.

A further object of this invention is to provide an improved packing rind that prevents materials flowing through the compressor, pump or the like from entering the lubrication system of the apparatus.

In addition, the improved packing ring of this invention obviates the necessity for external check valves and especially designed high pressure quills in the lubrication system.

SUMMARY OF THE INVENTION

In an improved compressor, pump or the like including a cylinder, a plunger arranged to reciprocate in the cylinder, and a source of lubricant under pressure, the improvement comprising: first annular means including a pressure responsive lip having a generally radially disposed sealing surface thereon; a second annular member having a face portion sealingly engaging the sealing surface on the lip; a lubricant passageway in one of the first or second annular members arranged for fluid communication with the lubricant source; and an arcuate groove formed in one of the face portions and sealing surface in fluid communication with the lubricant passageway. The lip is movable out of sealing engagement with the face portion in response to lubricant pressure whereby the lubricant passes between the sealing surface and face portion onto the plunger. The lip is also responsive to pressure in the compressor to more tightly engage the face portion to prevent entrance of the compressor pressure and materials into the lubricant passageway.

The foregoing and additional objects and advantages of the invention will become more apparent as the following detailed description is read in conjunction with the accompanying drawings.

DETAILED DESCRIPTION OF THE PREFERRED EMBODIMENT

Figure 1:
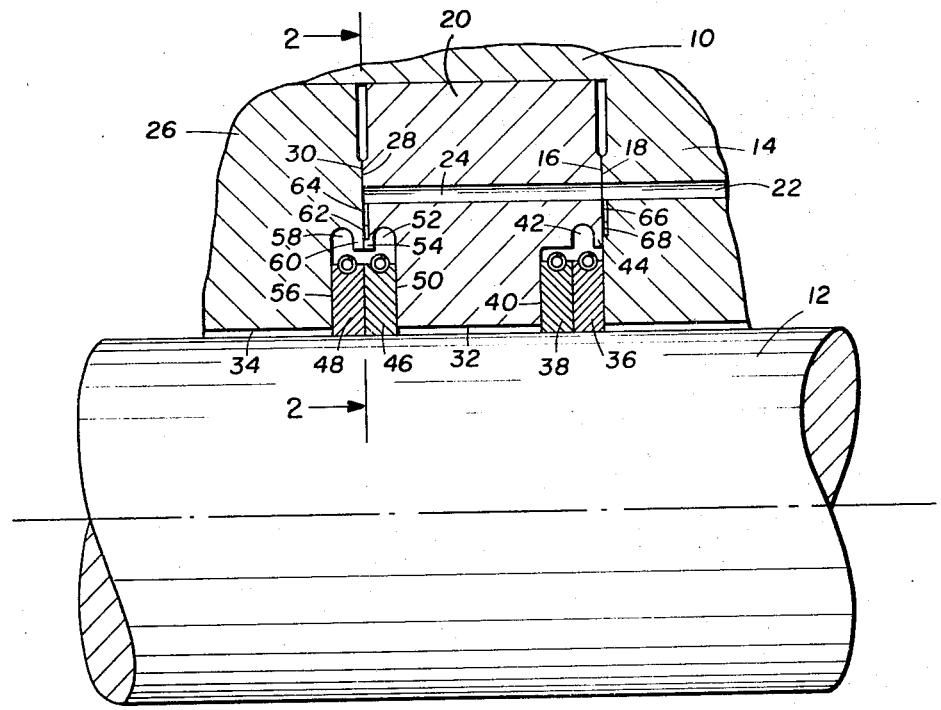
FIG. 1 is a fragmentary view, partly in elevation and partly in cross section, of a portion of a compressor incorporating packing constructed in accordance with the invention.

The fragmentary views of the drawing illustrate a compressor that includes a cylinder 10 having a plunger 12 mounted therein for reciprocating movement as is well known in the compressor art. An inwardly extending flange 14 on the cylinder 10 presents a radially disposed surface 16 that is in sealing engagement with an end surface 18 on an annular packing member 20. A lubricant passageway 22 extends through the cylinder 10 and is in fluid communication with a lubricant passageway 24 in the annular packing member 20. The lubricant passageway 22, at its opposite end, will be connected with a source (not shown) of lubricant under pressure.

A second annular packing member 26 is positioned adjacent the annular packing member 20 and has a radially disposed face 28 sealingly engaging a mating end surface 30 on the annular packing member 20. A bore 32 and a bore 34, each of which is slightly larger in diameter than the plunger 12, extends through the annular packing members 20 and 26, respectively.

Seal rings 36 and 38 encircle the plunger 12 and are located in a counterbore 40 formed in the end surface 18 of the annular packing member 20. One or both of the seal rings 36 and 38 sealingly engage the periphery of the plunger 12 and the seal ring 36 sealingly engages the surface 16 of the cylinder 10 to prevent the movement of fluid thereby as the plunger 12 moves on its compression stroke.

Annular groove 42 extends around the periphery of the counterbore 40 in the annular packing member 20 forming an inwardly extending, pressure responsive lip 44. The lip 44 carries a portion of the surface 18 that sealingly engages the surface 16 of the cylinder 10.

Seal rings 46 and 48, which may be identical to the seal rings 36 and 38, encircle the plunger 12. At least one of the rings 46 or 48 is in sealing engagement with the exterior thereof. The seal ring 46 is located in a counterbore 50 formed in the surface 30 of the annular member 20. An annular groove 52 encircles the counterbore 50 forming an inwardly extending, pressure responsive lip 54.

The seal ring 48 is located in a counterbore 56 formed in the face 28 of the annular packing member 26. An annular groove 58 encircling the counterbore 56 provides an inwardly extending, pressure responsive lip 60. The pressure responsive lips 54 and 60 each carry a portion of surfaces 28 and 30 that are in sealing engagement when the annular members 20 and 26 are assembled as shown in FIG. 1.

Figure 2:
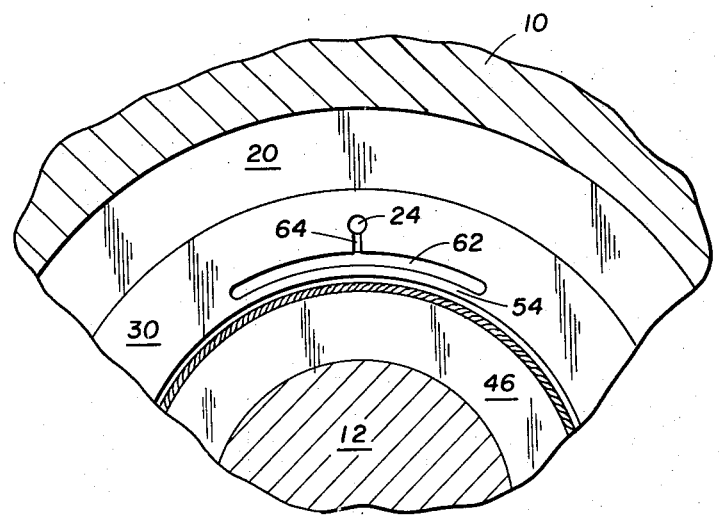
FIG. 2 is a fragmentary cross section taken generally along the line 2—2 of FIG. 1.

As shown most clearly in FIG. 2, the end surface 30 of the annular packing member 20 has an arcuate groove 62 formed in the lip 54. The arcuate groove 62 is connected by a groove 64 to the lubricant passageway 24 whereby lubricant in the passageway 24 can enter the groove 62. The arcuate groove 62, if desired, may extend entirely around the lip 54, but it has been found that adequate lubrication is provided when the groove 62 is constructed substantially as shown. The arcuate groove 62 is preferably positioned above the plunger 12 so that the lubricant migrates under the influence of gravity onto the seal rings 46 and 48 and then onto the surface of the plunger 12.

Referring again to FIG. 1, it can be seen that the lubricant passageway 22 is connected by a lubricant groove 66 with an arcuate groove 68 formed in the flange 14 of the cylinder 10. The arcuate groove 68 is located adjacent the pressure responsive lip 44 of the annular packing member 20. The arcuate grooves 62 and 68 and their connecting grooves can be located in either or both of the adjacent surfaces as desired.

In the foregoing, the grooves 42, 52 and 58, which form the pressure-responsive lips, have been described as being of annular configuration. While this is the preferred form and lends itself to ease of manufacture, it should be apparent that the lips need extend only around the bore a sufficient distance to provide the desired flexibility of the lips adjacent the arcuate grooves that are located therein.

In operation, the pressure responsive lips function in conjunction with the adjacent surfaces as integrally constructed check valves. For example, and even though the lips are preferably in initial sealing engagement with the adjacent mating surfaces, movement of the plunger 12 on its compression stroke causes the pressure to increase in the counterbores 40, 50 and 56. The pressure is applied to the pressure responsive lip 44 to force it into tighter sealing engagement with the surface 16 of the cylinder 10 and pressure responsive lips 54 and 60 are forced into tighter sealing engagement with each other. Since the various surfaces are in sealing engagement, none of the material being moved through the compressor can enter the lubricant grooves or passageways. Thus, the lubricant system is free from the cyclic pressures and free from any contaminants that might be in the compressor or pump.

As the plunger 12 moves on the intake stroke, the pressure in the counterbores 40, 50 and 56 is reduced. The pressure in the lubricant passageways 22 and 24 is sufficient to force the pressure responsive lip 44 away from the surface 16 of the cylinder 10 to permit lubricant to flow therebetween and onto the exterior of the plunger 12. Simultaneously, the lips 54 and 60 are forced apart and lubricant flows through the passageway 24 and through the lubricant groove 64 into the arcuate groove 62. Since the lips 54 and 60 are separated, the lubricant passes downwardly through the seal rings 46 and 48 and onto the exterior of the plunger 12.

From the foregoing, it can be appreciated that the improved packing described in detail provides a means for adequately and efficiently lubricating the plunger while eliminating the stress risers present in prior known devices and preventing the entrance of contaminants into the lubricating system of compressors, pumps or the like.

It will be understood that the foregoing detailed description is presented by way of example only and that many changes and modifications can be made thereto without departing from the spirit and scope of the invention.

The embodiments of the invention in which an exclusive property or privilege is claimed are defined as follows:

1. In an improved compressor, pump or the like including a cylinder, a plunger arranged to reciprocate in the cylinder, and a lubrication system including a source of lubricant under pressure, the improvement comprising:

first means having a bore arranged to encircle the plunger and including a pressure-responsive lip, said lip extending toward said bore and having a generally, radially-disposed sealing surface thereon;

second means having a bore arranged to encircle the plunger, said second means including a face portion sealingly engaging the sealing surface on said lip;

a lubricant passageway in one of said first and second means and arranged for fluid communication with the lubricant source;

an arcuate groove in one of said face portion and sealing surface in fluid communication with said passageway; and, said lip being movable out of sealing engagement with said face portion in response to lubricant pressure whereby said lubricant passes between said sealing surface and face portion onto the plunger, said lip being responsive to pressure in the compressor to more tightly engage said face portion to prevent leakage of the compressor pressure into said lubricant passageway.

2. The improvement of claim 1 wherein:
said first means also includes said lubricant passageway; and,
said second means includes said arcuate groove.

3. The improvement of claim 1 wherein said first means includes said lubricant passageway and arcuate groove.

4. The improvement of claim 1 wherein said second means includes said lubricant passageway and arcuate groove.

5. The improvement of claim 1 wherein:
said first means includes said arcuate groove; and,
said second means includes said lubricant passageway.

6. The improvement of claim 1 wherein said first and second means include an annular, pressure-responsive lip extending toward the bore therein and having said face portion thereon.

7. The improvement of claim 1 wherein said first and second means comprise first and second annular packing members, respectively, arranged to be located within the cylinder in encircling relationship to the plunger.

8. The improvement of claim 7 wherein:
said first annular packing member also includes said lubricant passageway; and,
said second annular packing member includes said arcuate groove.

9. The improvement of claim 7 wherein said first annular packing member includes said lubricant passageway and arcuate groove.

10. The improvement of claim 7 wherein said second annular packing member includes said lubricant passageway and arcuate groove.

11. The improvement of claim 7 wherein:
said first annular packing member includes said arcuate groove; and,
said second annular packing member includes said lubricant passageway.

12. The improvement of claim 7 wherein said second annular packing member includes a pressure-responsive lip extending toward the bore therein and having said face portion thereon.

* * * * *